Figure 1:
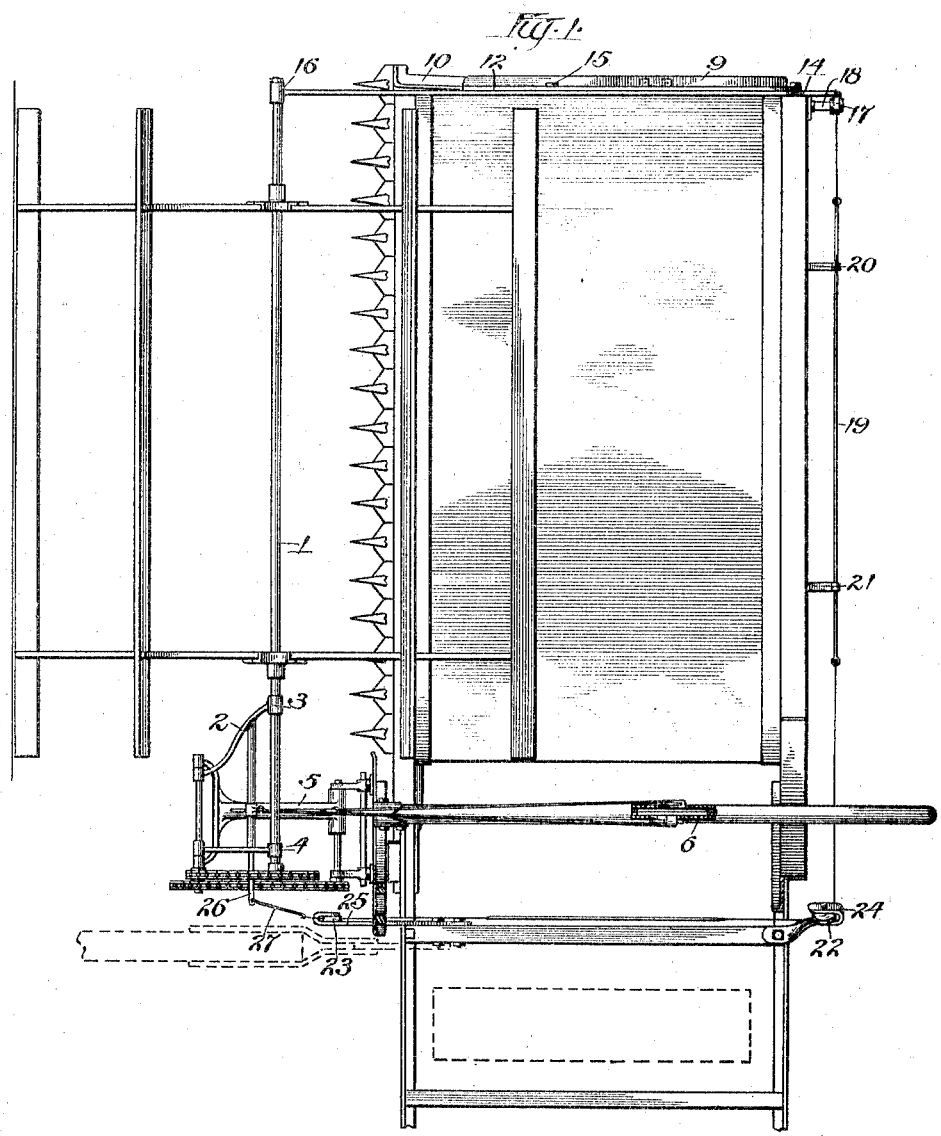

No. 766,900. PATENTED AUG. 9, 1904.
J. W. PRIDMORE.
HARVESTER REEL SUPPORT.
APPLICATION FILED MAR. 21, 1904.
NO MODEL. 2 SHEETS—SHEET 1.

Witnesses:
T. H. Alfreds.
J. N. Daggett.

Inventor:
John W. Pridmore.
By E. W. Burgess
Attorney

No. 766,900. PATENTED AUG. 9, 1904.
J. W. PRIDMORE.
HARVESTER REEL SUPPORT.
APPLICATION FILED MAR. 21, 1904.
NO MODEL. 2 SHEETS—SHEET 2.
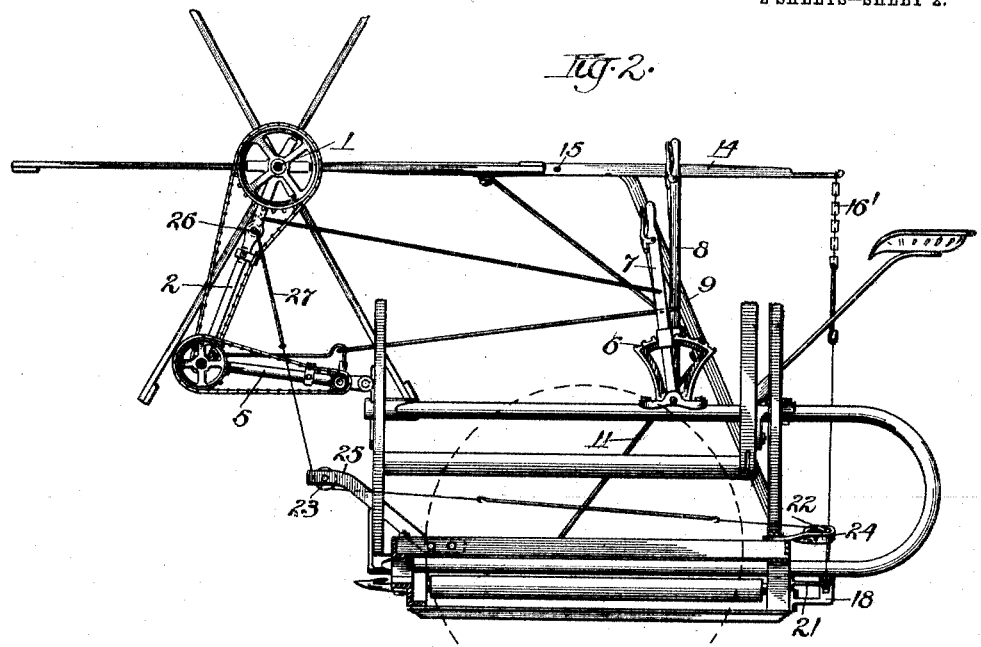
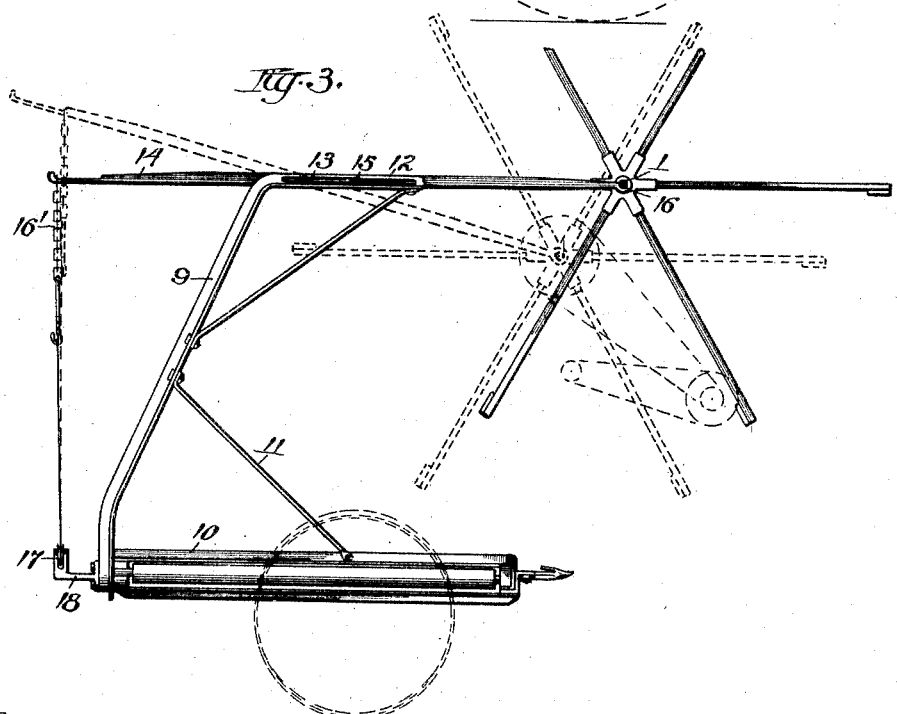
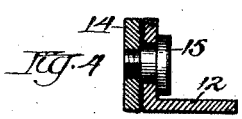

No. 766,900. Patented August 9, 1904.

UNITED STATES PATENT OFFICE.

JOHN W. PRIDMORE, OF CHICAGO, ILLINOIS, ASSIGNOR TO INTERNATIONAL HARVESTER COMPANY, OF CHICAGO, ILLINOIS, A CORPORATION OF NEW JERSEY.

HARVESTER-REEL SUPPORT.

SPECIFICATION forming part of Letters Patent No. 766,900, dated August 9, 1904.

Application filed March 21, 1904. Serial No. 199,108. (No model.)

*To all whom it may concern:*

Be it known that I, JOHN W. PRIDMORE, a citizen of the United States, residing at Chicago, in the county of Cook and State of Illinois, have invented certain new and useful Improvements in Harvester-Reel Supports, of which the following is a specification, reference being had to the accompanying drawings, forming a part thereof.

This invention relates to harvester-reel supports, and is designed particularly for that class of harvesters commonly known as "wide-cut" harvesters.

The object of the invention is to provide a supporting mechanism that will support the grainward end of the reel in a manner to maintain the parallelism of the reel and cutting apparatus at all times.

It consists in providing a journal-box for the grainward end of the reel-shaft, the box being supported on one end of a lever fulcrumed on a part of the platform-frame, connection being made between the opposite end of the lever and the reel-adjusting mechanism at the stubbleward side of the machine in a manner to cause simultaneous movement of the two ends.

The reel has the usual jointed arms and manipulating-levers for adjusting it in either an up-and-down or fore-and-aft direction.

In the drawings, Figure 1 is a plan of the reel-adjusting mechanism and as much of a harvester as is thought sufficient to illustrate the invention. Fig. 2 is an end elevation showing the adjusting-levers and the supporting means. Fig. 3 is a detail of the supporting means at the grainward end of the platform. Fig. 4 is a detail showing the manner in which the supporting-lever at the grainward end is connected with the fixed part of the platform-frame.

In the drawings the same reference-numerals designate like parts.

The reel-shaft 1 is journaled at its stubbleward end in the two-armed swinging link 2, having the bearings 3 and 4 for the reel-shaft at its upper end and being hinge-jointed at its lower end with the forward end of a swinging link 5, that is hinge-jointed to the harvester-frame at its inner end. A double sector-rack 6 is secured to the harvester-frame, and the adjusting-levers 7 and 8 are pivoted thereto and provided with the usual locking-detents and operating thumb-latches engaging therewith. The levers are connected, by means of rods, with the reel-supporting links in a well-known manner.

It is understood that the means for supporting and adjusting the stubbleward end of the reel may be any of the usual forms common to this class of machines.

At the grainward end of the platform and from its rear side is secured a standard 9, suitably connected with the end sill 10 by means of the brace 11. The upper end of the standard is provided with the forwardly-projecting horizontal portion 12, having the slot 13. A lever 14 is connected with the horizontal portion of the arm by means of a stud 15, as shown in detail in Fig. 4. The forward end of the lever 14 is provided with a journal-supporting box 16, in which the outer end of the reel-shaft 1 has its bearing. The opposite end of the lever 14 is provided with a portion adapted to be connected with a cable or short chain section 16', the short chain section being preferred, as it affords a convenient means of adjustment of the parts.

The outer rearward corner of the platform is provided with a sheave 17, suitably supported and journaled in a bracket 18, the sheave being a guide for the cable. After passing beneath the guiding-sheave 17 the cable is preferably connected to a rod 19, adapted to slide through supporting-arms 20 and 21, secured to the rear of the harvester-platform.

Near the stubbleward end of the platform and on opposite sides thereof are two guiding-sheaves 22 and 23, supported and journaled in brackets 24 and 25, secured to opposite sides of the harvester-frame.

The upper member 2 of the reel supporting and adjusting links is provided with a laterally-projecting portion 26, adapted to receive the end of the cable or a short connecting-rod 27, forming an extension of the cable.

The device operates in the following manner: When the lever 8 is used to raise the reel by swinging the link 5 upward on its hinge connection, it carries with it the supporting-link 2, and it by means of the connecting-cable draws downward on the rearward end of the lever 14 and simultaneously raises the grainward end of the reel-shaft. If it be desired to lower the reel, the hand-lever 8 is moved in an opposite direction. When the reel is moved in a fore-and-aft direction by means of the lever 7, the fulcrum 15 of lever 14 moves along the slot 13 in the horizontal portion 12 of the standard 9.

It is understood that the lever-arms are so proportioned relative to each other as to maintain a proper parallelism of the reel and platform, by means of the cable connection, through the whole range of its adjustment.

What I claim, and desire to secure by Letters Patent, is—

1. In a reel-supporting mechanism for harvesters, the combination of a reel-shaft having its stubbleward end journaled in a movable support, and means for adjusting said support both up and down, forward or backward relative to the harvester, the opposite end of said shaft journaled at one end of a lever having pivotal and sliding connection with a part secured to the harvester-platform and having its opposite end extending rearward therefrom, and a connection between said movable support at the stubbleward end and the rear end of said lever, whereby they are caused to move simultaneously and maintain the relative parallelism of the reel and platform.

2. In a reel-supporting mechanism for harvesters, the combination of a reel-shaft having its stubbleward end journaled in a movable support, and means for adjusting said support both up and down, forward or backward relative to the harvester, the opposite end of said shaft being journaled at one end of a lever having pivotal and sliding connections with a part secured to the harvester-platform, and having its opposite end extending rearward therefrom, and a flexible connection between said movable support at the stubbleward end and the rear end of said lever whereby they are caused to move simultaneously and maintain the relative parallelism of the reel and platform.

In witness whereof I hereto affix my signature in presence of two witnesses.

JOHN W. PRIDMORE.

Witnesses:
GEORGE W. HENDERSON,
CHAS. N. CHAMBERS.